UNITED STATES PATENT OFFICE.

ALFRED MONNIER, OF CAMDEN, NEW JERSEY.

IMPROVEMENT IN THE TREATMENT OF METALLIC SULPHURETS.

Specification forming part of Letters Patent No. 20,655, dated June 22, 1858.

*To all whom it may concern:*

Be it known that I, ALFRED MONNIER, of the city of Camden, and State of New Jersey, have invented a new and useful Improvement in the process of obtaining oxides from native sulphurets or arsenio-sulphurets of iron, copper, cobalt, nickel, zinc, or other metals; and I do hereby declare the following to be a full and exact description of the same.

Heretofore it has been customary to obtain the oxides of iron, copper, cobalt, nickel, zinc, or other metals from the native sulphuret or arsenio-sulphuret by roasting them in a pile, mixed with wood or coal, or in a reverberatory furnace, after having broken them into small fragments or crushed them into powder. Sometimes—as, for example, in the sulphuret or arsenio-sulphuret of copper, cobalt, or nickel—the roasting has been partially effected only after a first fusion with a suitable flux, so as to remove the gangues and the sulphuret or arsenio-sulphuret, and then roasted, as stated above. In either of these modes the operation is long and difficult, and requires a large amount of fuel to expel the arsenic and sulphur from them.

My improvement has for its object the obtaining of oxide of iron, copper, cobalt, nickel, zinc, or of those of other metals, whether simple or mixed, from the native sulphurets or arsenio-sulphurets of these metals, respectively, whether they be simple or compound, or whether they contain a mixture of sulphurets and arsenio-sulphurets, such as sulphuret or arsenio-sulphuret of copper, &c.; and I treat the sulphuret or arsenio-sulphuret as follows: If I wish to obtain the oxide of iron, then I pulverize the native sulphuret or arsenio-sulphuret of iron, and mix it thoroughly with from thirty-three to seventy-five per cent. of its weight of either caustic soda, carbonate of soda, sulphuret of sodium, sulphate of soda, or with corresponding compounds of potash, or with sulphate of lime, sulphate of baryta, sulphate of strontia, or sulphate of zinc. To this compound a sufficient quantity of water is added to keep it moist, (a little sulphuric acid may be added with advantage,) and the mixture is retained in a state of moisture for eight or ten days, and is afterward molded into blocks of any convenient size or shape. When it is desired to use these blocks they are to be heated, so as to expel the water. This expulsion of the water also leaves the mass in a porous state and facilitates its combustion. If it is desired to employ the mixture at once, a smaller quantity of water may be employed, sufficient to make the mass coherent, and this mixture is immediately made into blocks. The blocks are roasted in a reverberatory furnace, such as is ordinarily used for roasting sulphuret of copper; with this difference, that the compound mass need not be turned over, as is ordinarily required in such furnaces. From two to two and a half hours is sufficient for the expulsion of the sulphur and arsenic. This compound burns very freely, and all, or nearly all, the sulphur and arsenic is expelled. When it is an arsenio-sulphuret or arseniuret, the addition to the above compound of a small jet of steam in the reverberatory furnace accelerates its decomposition. When caustic soda, sulphuret of sodium, sulphate of soda, carbonate of soda, or either of the corresponding salts of potash are employed, the residue, after the sulphur and arsenic have been expelled, will contain sulphate of soda, or a salt of potash and peroxide of iron, or oxide of copper, cobalt, nickel, zinc, or the oxide of the metal treated, simple or mixed, if the sulphurets or arsenio-sulphurets of those metals are treated.

The sulphate of soda or salt of potash can be dissolved in water, and by evaporation can be obtained free from the oxide of iron or the oxides of metals above mentioned, and this sulphate of soda or salt of potassa can be again used for the decomposition of a fresh quantity of sulphuret of iron or pyrites or sulphurets or arsenio-sulphurets of the metals above mentioned. When sulphate of iron is used in the first instance with the pyrites the residue is peroxide of iron only; or if sulphate of lime, of strontia, or of baryta be employed, the residue will be sulphate of lime, of strontia, or of baryta mixed with peroxide of iron. If sulphuret of zinc or sulphuret of copper, or analogous sulphuret, be employed, the above-mentioned process is the same, except that the sulphate of zinc or the sulphate of copper, respectively, should be substituted for the sulphate of iron.

If it is desired to obtain the sulphuret of copper, cobalt, or nickel, the calcination should not be pushed too far, so that a portion of sulphur may still remain in the mixture, and after extracting the sulphate of soda, &c., by lixiviation the residue may be fused into a valuable sulphuret, the oxide of iron, if present, uniting with a flux, and being removed from the sulphuret; or the sulphuret can be roasted completely and be fused, with the addition of a small quantity of sulphuret, so as to have the sulphur necessary to form a sulphuret of copper, cobalt, or nickel, simple or compound.

Instead of using caustic soda, sulphuret of sodium, sulphate of soda, or sulphate of iron, or either of the salts of potash above named in the solid state in the first stage of the process, these can be used in the state of a concentrated solution.

Either of the salts above mentioned, either simple or mixed or in combination with other compounds, and perhaps some salts or compounds not mentioned above, could be used in the preliminary treatment of the pyrites or sulphuret or arsenio-sulphuret; but the sulphate of soda is the most advantageous and economical.

The advantage of my improved process above described is that all, or nearly all, the sulphur and arsenic contained in the sulphuret or arsenio-sulphuret of iron or other metallic sulphurets or arsenio-sulphurets can be expelled, the sulphur as sulphurous acid, ($SO_2$,) and the arsenic as arsenious acid, ($ASO_3$,) which can be collected in condensure, giving an oxide of iron for paint, but more especially when the pyrites contain gold, inasmuch as it facilitates the processes of amalgamation, which were difficult with the old process of removing sulphur; and the oxides of copper, nickel, cobalt, and zinc, or other oxides, whether mixed or simple, can be obtained with much less expense, labor, and delay, which oxides can be reduced or worked, as may be preferred.

Instead of pulverizing the sulphurets or arsenio-sulphurets, as found native, and mixing them immediately with either of the substances above mentioned in the first instance, the native sulphuret or arsenio-sulphuret might be partially reduced by a simple roasting or fusion, and the residue treated by pulverizing and mixing it, as above described; or, instead of mixing the native sulphuret with the above-mentioned substances immediately, the oxides can be obtained by dissolving the native sulphuret or arsenio-sulphuret of iron, copper, &c., in sulphuric acid or other acid, and precipitated by sulphureted hydrogen or other precipitant, as a sulphuret of copper, &c., and this sulphuret can be mixed and burned, as above described.

Having thus described my improved process, what I claim as my invention, and desire to secure by Letters Patent, is—

The process of obtaining oxides of iron, copper, cobalt, nickel, zinc, or other oxides from their native sulphurets or arsenio-sulphurets by mixing them in a state of powder with the substances as above described, in order to expel all, or nearly all, the sulphur and arsenic.

ALFRED MONNIER.

Witnesses:
  J. H. B. JENKINS,
  J. E. SHAW.